Patented Sept. 18, 1923.

1,468,609

UNITED STATES PATENT OFFICE.

WILLIAM THOMAS FORSE, FREDERICK WILLIAM JONES, JR., AND GEORGE WALTERS, OF LONDON, ENGLAND, ASSIGNORS TO COLUMBIA GRAPHOPHONE MANUFACTURING COMPANY, OF BRIDGEPORT, CONNECTICUT, A CORPORATION OF DELAWARE.

PLASTIC COMPOSITION OF MATTER HAVING A BASIS OF CELLULOSE ESTER.

No Drawing.   Application filed November 16, 1922.   Serial No. 601,268.

*To all whom it may concern:*

Be it known that we, WILLIAM THOMAS FORSE, FREDERICK WILLIAM JONES, Jr., and GEORGE WALTERS, subjects of the King of Great Britain and Ireland, and residing at London, England, have invented certain new and useful Improvements in the Manufacture of Plastic Compositions of Matter Having a Basis of Cellulose Ester, of which the following is a specification.

This invention relates to compositions of matter having a basis of cellulose ester and employed for the manufacture of gramophone records and similar products that are moulded under pressure with the application of heat.

The object of the present invention is to provide improved plastic or thermoplastic materials of the character referred to, which shall be particularly suitable for the purpose named; and the invention consists in a plastic or thermoplastic material of the character referred to, having one or more resins incorporated therewith.

The invention also consists in articles formed from thermoplastic material of the above character, and other details and arrangements hereinafter described or indicated.

In carrying our invention into effect in one convenient manner, we form our improved thermoplastic material with a base of cellulose acetate and a non-volatile gelatinizer, or mixture of gelatinizers of cellulose acetate, of which the following may be given as examples:—

Sulphonamides, e. g., para-toluene-sulphoanilide.

Compound ureas, e. g., diethyl diphenyl urea.

Anilides and their homologues, e. g., form-o-toluidide (formanilide).

Urethanes, e. g., phenyl urethane.

Esters of oxamic acid, e. g., phenyl oxamic ester.

Cyclohexanone and similar bodies.

The cellulose acetate, together with the gelatinizer, or mixture of gelatinizers, may be mixed or incorporated with resinous materials—such as copals, or one or more of the resins known as "acaroid resins" or "xanthorrhea resins"—which assist in forming a plastic mass and add desirable qualities to the finished product, and we may also incorporate with the mass certain filling materials—such as carbon black, barytes, rotten stone and kieselguhr—the object of the filling materials being to reduce the cost of manufacture and (or) to impart hardness or other qualities to the finished product.

As an example of one method of carrying out the invention in its application to the manufacture of a gramophone record, we take two parts of cellulose acetate and this we mix with one part of acaroid resin, and one part of phenyl oxamic ester. The mixture is incorporated between steam-heated rolls until gelatinization is completed. To the gelatinized mass three parts of carbon black are then added and incorporation continued until the plastic mass is uniform. The plastic mass is then removed from the rolls and allowed to cool, and the hard material thus obtained is then ground to a fine powder and used to make the surface of laminated or other records; or before cooling, it may be formed into rough blocks which are then allowed to cool and are reheated and pressed to form non-laminated records.

It must be understood that our invention is not restricted to this composition, or this method of manufacture. We may use volatile solvents—such as acetone—to assist gelatinization of the mixture, and either free the mixture from volatile solvent and recover the hard residue; or spread the soft mixture on paper, fabric, or other surfaces, and then dry previous to moulding, using the sheets thus obtained as in the manufacture of our laminated records.

Having now particularly described and ascertained the nature of our said invention, and in what manner the same is to be performed, we declare that what we claim is:—

1. As a new article of manufacture, a cellulose ester phonograph record including acaroid resin.

2. As a new article of manufacture, a cellulose acetate phonograph record including acaroid resin.

3. As a new article of manufacture, a cellulose ester record including acaroid resin and a filler.

4. As a new article of manufacture, a cellulose acetate record including acaroid resin and a filler.

5. A record material in granular form including cellulose acetate and an acaroid resin.

6. A record material in granular form including cellulose acetate, an acaroid resin, and a filler.

7. As a new article of manufacture, a record composed of material including a cellulose ester, formanilide, and acaroid resin.

8. As a new article of manufacture, a record composed of material including cellulose acetate, formanilide, and acaroid resin.

9. As a new article of manufacture, a record material in granular form including cellulose acetate, formanilide, acaroid resin, and a filler.

10. As a new article of manufacture, a record composed of material including a cellulose ester, formanilide, and acaroid resin.

11. As a new article of manufacture, a record composed of material including cellulose acetate, formanilide, and acaroid resin.

12. A cellulose ester phonograph record including one of the resins of the class known as "acaroid" or "xanthorrhea".

13. A cellulose acetate phonograph record including one of the resins of the class known as "acaroid" or "xanthorrhea".

14. As a new article of manufacture, a record composed of material including a cellulose ester, formanilide, barium sulphate, and a resin.

15. As a new article of manufacture, a record composed of material including cellulose acetate, formanilide, barium sulphate, and a resin.

16. The process of making a record material which includes mixing two parts of cellulose acetate with one part of acaroid resin, and one part of a gelatinizer, applying the mass between heated rolls until gelatinization is complete, adding to the mass three parts of carbon black, removing the mass from the rolls and cooling, and then grinding into powder form.

17. A record for phonographs or the like, characterized in that the plastic material used in its manufacture contains acaroid resin besides a cellulose ester, a gelatinizer, and filling agents.

18. A record according to claim 17, characterized in that the quantity of acaroid resin in the plastic material does not exceed that of the gelatinizer.

19. A record according to claim 17, characterized in that the quantity of gelatinizer in the plastic mass is about one-half of that of the cellulose ester.

20. A phonograph record composed of two parts cellulose acetate, one part acaroid resin, one part gelatinizer, and at least three parts of filling material.

In testimony whereof we have signed our names to this specification.

WILLIAM THOMAS FORSE.
FREDERICK WILLIAM JONES, Jr.
GEORGE WALTERS.

Witnesses:
JAMES VAN ALLEN SHIELDS,
S. SCHINDEL.